(12) United States Patent
McAlinden et al.

(10) Patent No.: US 8,371,537 B2
(45) Date of Patent: Feb. 12, 2013

(54) AIRCRAFT STRUCTURE WITH HINGE RIB ASSEMBLY

(75) Inventors: Jon McAlinden, Bristol (GB); Kim Sharp, Bristol (GB)

(73) Assignee: Airbus Operations Limited, Bristol (GB)

( * ) Notice: Subject to any disclaimer, the term of this patent is extended or adjusted under 35 U.S.C. 154(b) by 906 days.

(21) Appl. No.: 12/370,657

(22) Filed: Feb. 13, 2009

(65) Prior Publication Data

US 2009/0218446 A1    Sep. 3, 2009

(30) Foreign Application Priority Data

Feb. 29, 2008    (GB) .................................. 0803690.7

(51) Int. Cl.
*B64C 3/18*    (2006.01)
(52) U.S. Cl. ........................ 244/215; 244/213; 244/89
(58) Field of Classification Search .......... 244/213–217, 244/99.2–99.4, 87, 88, 89, 90 A, 90 R
See application file for complete search history.

(56) References Cited

U.S. PATENT DOCUMENTS

| | | | |
|---|---|---|---|
| 2,376,745 A | 3/1943 | Wimer, Jr. et al. | |
| 2,421,960 A | 9/1943 | Pagon | |
| 2,418,060 A | * | 3/1947 | Watter ............................ 244/87 |

FOREIGN PATENT DOCUMENTS

| | | |
|---|---|---|
| EP | 0239138 A2 | 9/1987 |
| EP | 0947421 A1 | 10/1999 |
| GB | 490964 | 8/1938 |
| WO | 2007096624 A2 | 8/2007 |

OTHER PUBLICATIONS

British Search Report for GB0803690.7 Dated Apr. 27, 2008.

* cited by examiner

*Primary Examiner* — Timothy D Collins
*Assistant Examiner* — Jamie S Stehle
(74) *Attorney, Agent, or Firm* — Lowe Hauptman Ham & Berner, LLP

(57) ABSTRACT

An aircraft structure comprising; a rear spar, an upper cover which is attached to the rear spar and overhangs to its rear; a lower cover which is attached to the rear spar and overhangs to its rear, a hinge rib assembly comprising: a first hinge rib arm attached to a first one of the covers; and a second hinge rib arm connected to the first hinge rib arm and attached to a second one of the covers; and an aerodynamic control element pivotally mounted to the hinge rib assembly. The first and second hinge rib arms are separate parts. This provides the ability to disassemble the hinge rib in-situ for repair or maintenance purposes; the ability to install or remove the hinge rib without having to move it inboard along the structure; reduced material wastage during manufacture; and the ability to install one or more elongate lines which extend in a span-wise direction along the aircraft structure.

14 Claims, 14 Drawing Sheets

AIRCRAFT STRUCTURE WITH HINGE RIB ASSEMBLY

RELATED APPLICATIONS

The present application is based on, and claims priority from, British Application Number 0803690.7, filed Feb. 29, 2008, the disclosure of which is hereby incorporated by reference herein in its entirety.

FIELD OF THE INVENTION

The invention relates to a hinge rib assembly for pivotally mounting an aerodynamic control element to an aircraft structure, an aircraft structure incorporating such a hinge rib assembly, and a method of installing an aerodynamic control element using such a hinge rib assembly.

BACKGROUND OF THE INVENTION

FIG. 1 shows a trailing edge 1 of a conventional aircraft wing comprising a C-section rear spar 3 consisting of a spar web 4 and upper and lower flanges 5, 6. Upper and lower covers 7, 8 are attached to the upper and lower flanges 5, 6 of the spar 3 and extend to its rear. An upper panel 9 is attached to the upper cover 7 with a butt-strap 17. A hinge rib 2 comprises two integrally formed arms 11, 12 forming a so-called "A-frame". The upper arm 11 is attached to the upper cover 7 via the butt-strap 17 and its foot is attached to the spar web 4. The foot of the lower arm 12 is attached to the lower cover 8 and to the spar web 4. A spoiler 13 is pivotally connected to the hinge rib 2 about a hinge line 14. An actuator (not shown) deploys the spoiler up from the neutral position shown in FIG. 1. Flexible lines 15 (such as hydraulic pipes and electrical cables) are installed in a gap 16 between the spar web 4 and the two arms 11, 12 of the hinge rib 2.

These lines 15 can be awkward to install, as they need to be pulled through the gap 16 progressively, incurring a risk of snagging or damage. Moreover, there is currently a trend on modern large passenger aircraft to minimise the size of the wing section in order to improve its aerodynamic efficiency. This continuing reduction in size, coupled with an increase in systems complexity, makes existing hinge rib designs increasingly difficult to implement.

A further problem with the conventional hinge rib design is as follows. The overhanging portions of the upper and lower covers 7, 8 converge slightly towards each other. As a result it is not possible install or remove the hinge rib 2 by moving it fore or aft respectively. This can create complications during maintenance or installation of the hinge ribs 2. FIG. 2 shows a line of hinge ribs, each attached to the web 4 of a C-section rear spar. Note that the upper and lower covers and the spoiler are omitted in FIG. 2. It should also be noted that the hinge ribs shown in FIG. 2 differ slightly from the one shown in FIG. 1. In the case of FIG. 2, the hinge ribs further comprise a base 18 which extends between the feet of the upper and lower hinge rib arms 11, 12 and is attached to the spar web 4.

The height 17 of the spar web 4 gradually decreases in an outboard direction along the span of the wing. Therefore a conventional solution to the problem identified above is to move the hinge rib inboard to a point where the height of the web 4 is such that the closed angle between the upper and lower covers no longer traps the hinge rib. Thus for example if hinge rib A is damaged and has to be removed for maintenance, it may be necessary to move it inboard to a point E before removing the hinge rib in an aft direction. This requires the otherwise unnecessary removal of neighbouring hinge ribs B, C and D, adding complexity and cost to the maintenance operation.

Using the traditional single piece A-frame design for the hinge rib also does not make optimum use of the material or billet from which the hinge rib is machined, resulting in a large amount of waste. Also the grain flow in the billet can never be fully structurally optimized as the longitudinal grain flow of the material can never be aligned to both the legs of the A-frame, which may be at angles of up to 90 degrees to each other.

Alternative hinge rib designs such as shear webs can offer a more weight optimized structural solution but may be less efficient in material cost and are worse for systems installation. Also shear webs can cause significant thermal problems as they will tend to act as baffles to any global airflow that would normally aid the cooling process along the trailing edge of the wing.

SUMMARY OF THE INVENTION

A first aspect of the invention provides a method of installing an aerodynamic control element on an aircraft structure, the aircraft structure comprising a rear spar, an upper cover which is attached to the rear spar and overhangs to its rear, and a lower cover which is attached to the rear spar and overhangs to its rear, the method comprising in any order: a) attaching a first hinge rib arm to a first one of the covers; b) assembling a hinge rib by connecting the first hinge rib arm to a second hinge rib arm; c) attaching the second hinge rib arm to a second one of the covers; and d) pivotally mounting the aerodynamic control element to the hinge rib.

The steps in the method of assembly may be performed in any order, but preferably step a) and/or step c) is performed before step b).

A second aspect of the invention provides an aircraft structure comprising; a rear spar, an upper cover which is attached to the rear spar and overhangs to its rear; a lower cover which is attached to the rear spar and overhangs to its rear, a hinge rib assembly comprising: a first hinge rib arm attached to a first one of the covers; and a second hinge rib arm connected to the first hinge rib arm and attached to a second one of the covers; and an aerodynamic control element pivotally mounted to the hinge rib assembly; wherein the first and second hinge rib arms are separate parts.

A third aspect of the invention provides a hinge rib assembly for pivotally connecting an aerodynamic control element to an aircraft structure, the hinge rib assembly comprising: a first hinge rib arm connected to a second hinge rib arm, wherein the first and second hinge rib arms are separate parts.

Providing the hinge rib as an assembly of two parts provides a number of advantages, including (but not limited to):
 the ability to disassemble the hinge rib in-situ for repair or maintenance purposes;
 the ability to install or remove the hinge rib without having to move it inboard along the structure;
 reduced material wastage during manufacture; and
 the ability to install one or more elongate lines which extend in a span-wise direction along the aircraft structure more easily (typically before step b) and/or before step c)).

The first hinge rib arm may be pivotally connected to the second hinge rib arm, or attached via a rigid connection.

The second hinge rib arm may be pivotally connected to the second one of the covers, or attached via a rigid connection.

The hinge rib assembly may be designed in a variety of ways in order to be pivotally connected to the control element.

For instance the hinge rib assembly may have a projection which extends along the hinge line and is received in a hole in the control element (or vice versa). Alternatively the control element and hinge rib assembly may form a clevis joint, with the clevis being carried by the hinge rib or by the control element. Alternatively, the control element may be connected to the hinge rib assembly by a halving joint.

Most typically the structure comprises an aerofoil such as a main wing element or horizontal tail plane. Alternatively the structure may comprise a vertical tail plane or other element of an aircraft.

The aerodynamic control element may comprise a flap, spoiler, aileron, elevator, rudder, or any other control element pivotally attached to the trailing edge of an aircraft structure.

Various preferred features of the invention are set out in the dependent claims.

DESCRIPTION OF FIGURE(S)

Embodiments of the invention will now be described with reference to the accompanying drawings, in which.

Figure 18:
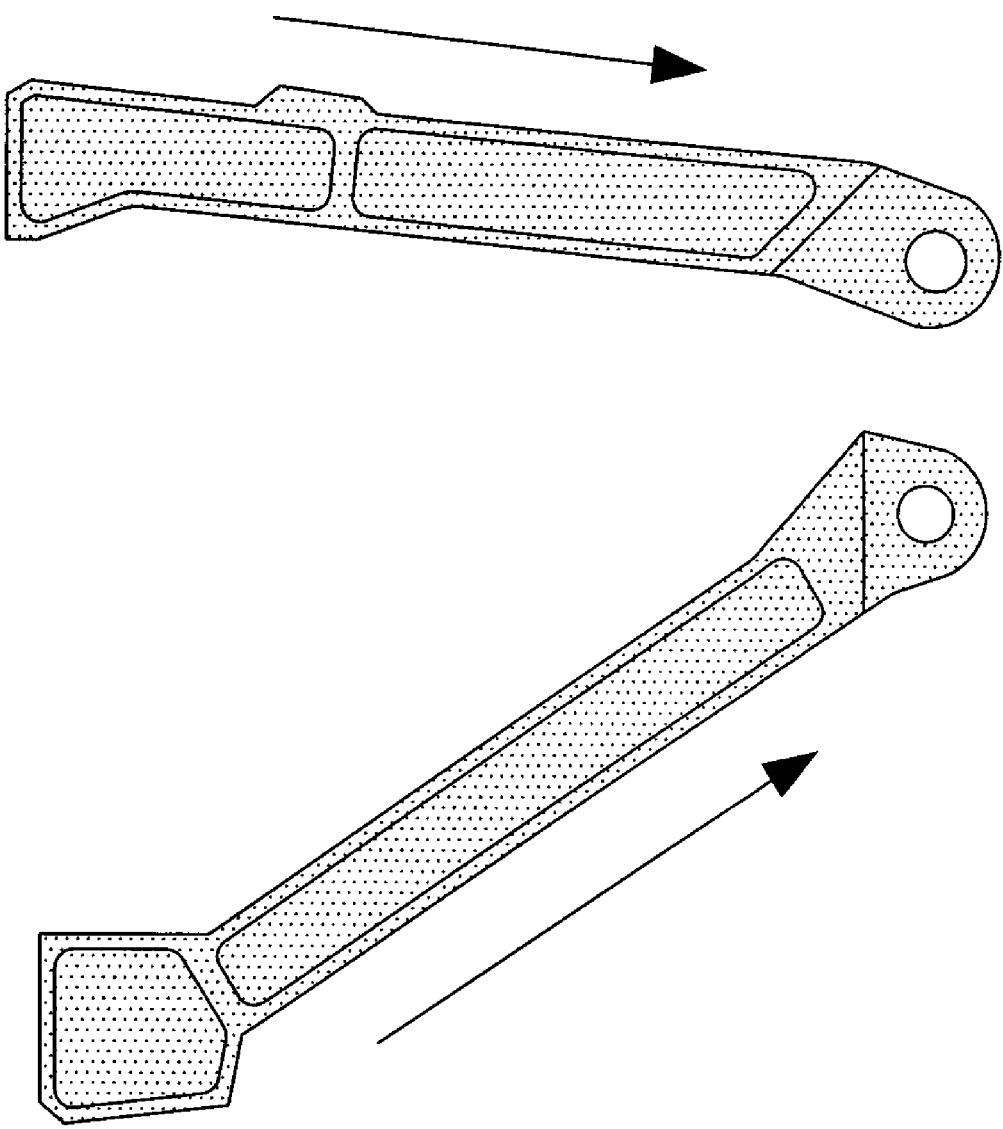
Figure 19:
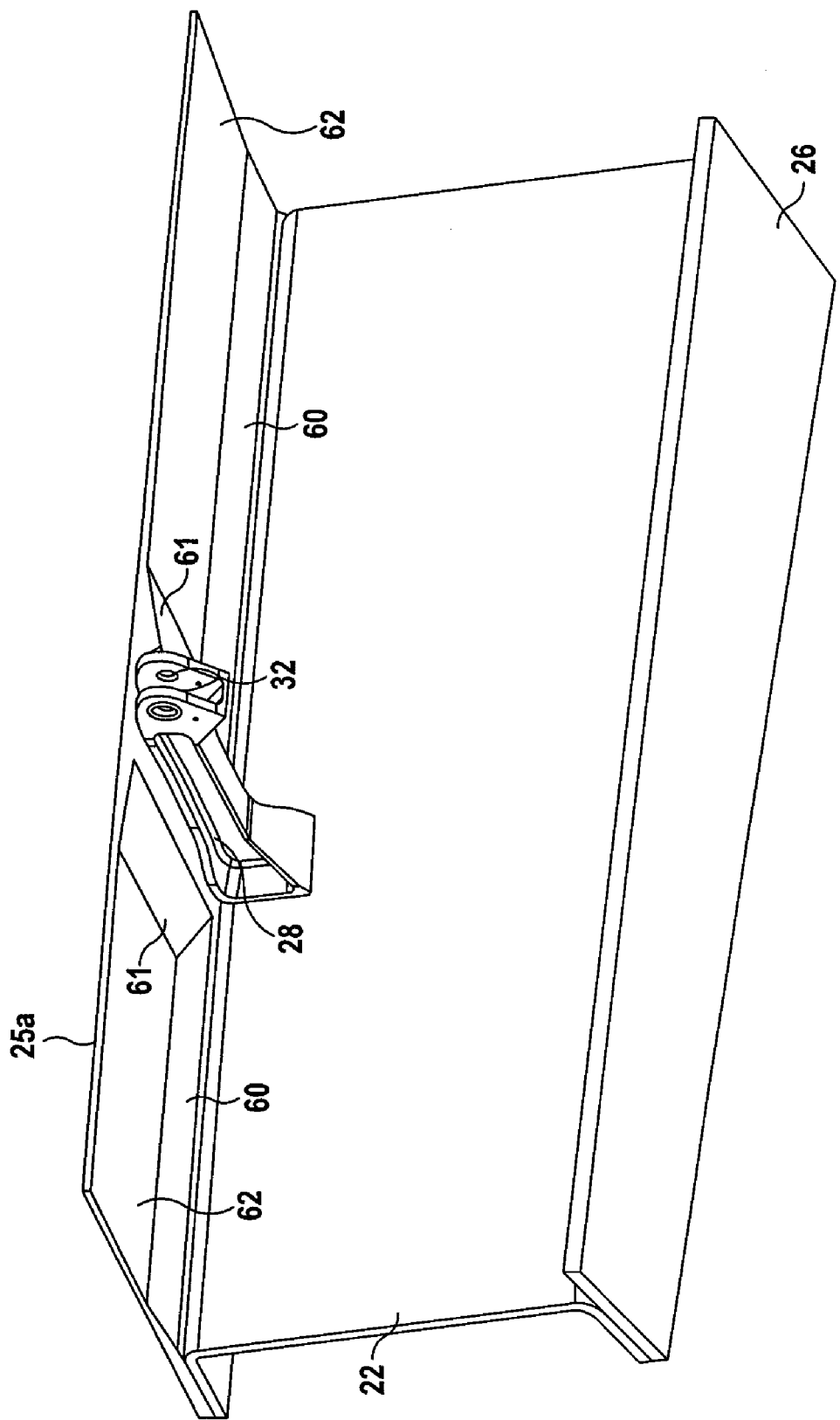

FIG. 18 indicates the grain flow direction of the material in each arm of the hinge rib;

FIG. 19 shows a hinge rib arm attached to a ramped composite upper cover; and

Figure 20:
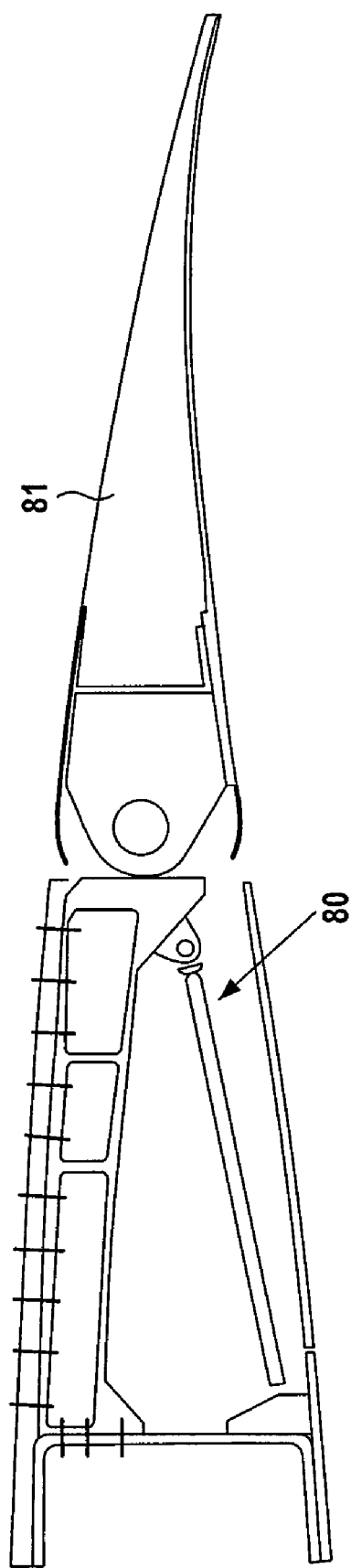

FIG. 20 is a sectional side view showing an aileron pivotally attached to the trailing edge of an aircraft wing by a further two-part hinge rib assembly.

DETAILED DESCRIPTION OF EMBODIMENT(S)

Figure 3:
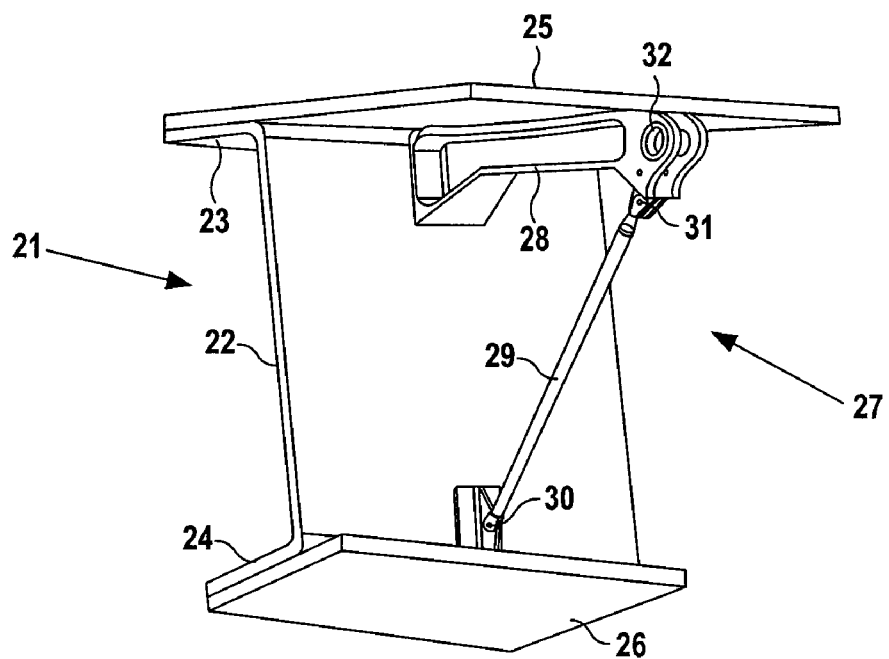
FIG. 3 is a perspective view of a first hinge rib attached to the trailing edge of an aircraft wing.
Figure 4:
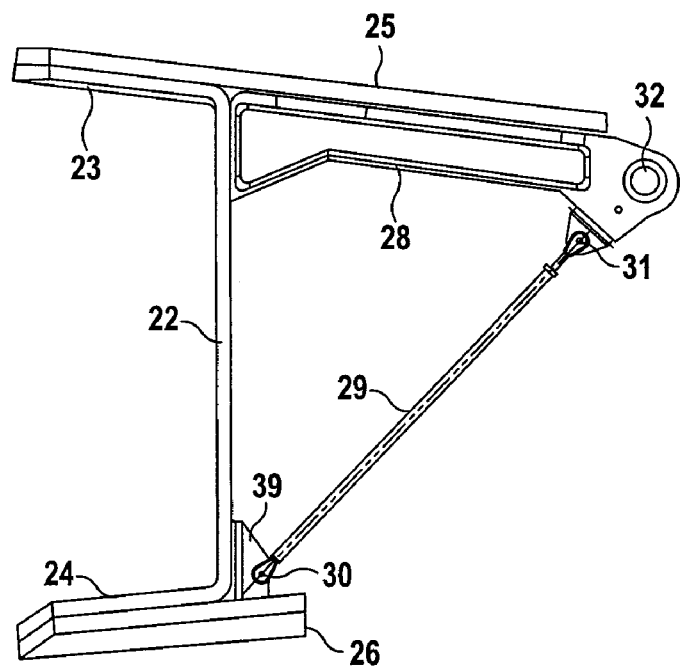
FIG. 4 is a side view of the hinge rib of FIG. 3.

FIGS. 3 and 4 show part of the trailing edge of a wing comprising a C-section rear spar 21 with a web 22 and upper and lower flanges 23, 24. Composite upper and lower covers 25, 26 are attached to the upper and lower flanges. A variety of types of composite material may be used, but most typically the covers are formed from a laminar composite material, each ply comprising a set of unidirectional carbon fibres impregnated with an epoxy resin matrix. The covers each extend forward of the spar flanges to form the upper and lower boundaries of a wing box (not shown). They also extend aft of the spar web to form respective overhanging portions shown in FIGS. 3 and 4. A two-part hinge rib assembly 27 connects a spoiler 70 (shown in FIG. 7) to the overhanging portions of the upper and lower covers 25, 26 and to the spar web 22.

The hinge rib assembly 27 comprises an upper hinge rib arm 28 and a lower hinge rib arm 29 which extends longitudinally at an acute angle to the upper hinge rib arm to form a so-called "A-frame" shape. The upper hinge rib arm 28 is connected along its length to the overhanging portion of the upper cover 25 by fasteners (indicated schematically by lines 72 in FIG. 7) and its foot is connected to the spar web 22 by fasteners (indicated schematically by lines 73 in FIG. 7). The lower hinge rib arm 29 comprises a rod with a clevis at its foot which is pivotally connected to a bracket 39 at a clevis joint 30. The bracket 39 is attached by fasteners (not shown) to the overhanging portion of the lower cover 26 and to the spar web 22. Unlike previous designs, the arms 28 and 29 are separate parts which are pivotally attached to each other at a second clevis joint 31.

Figure 7:
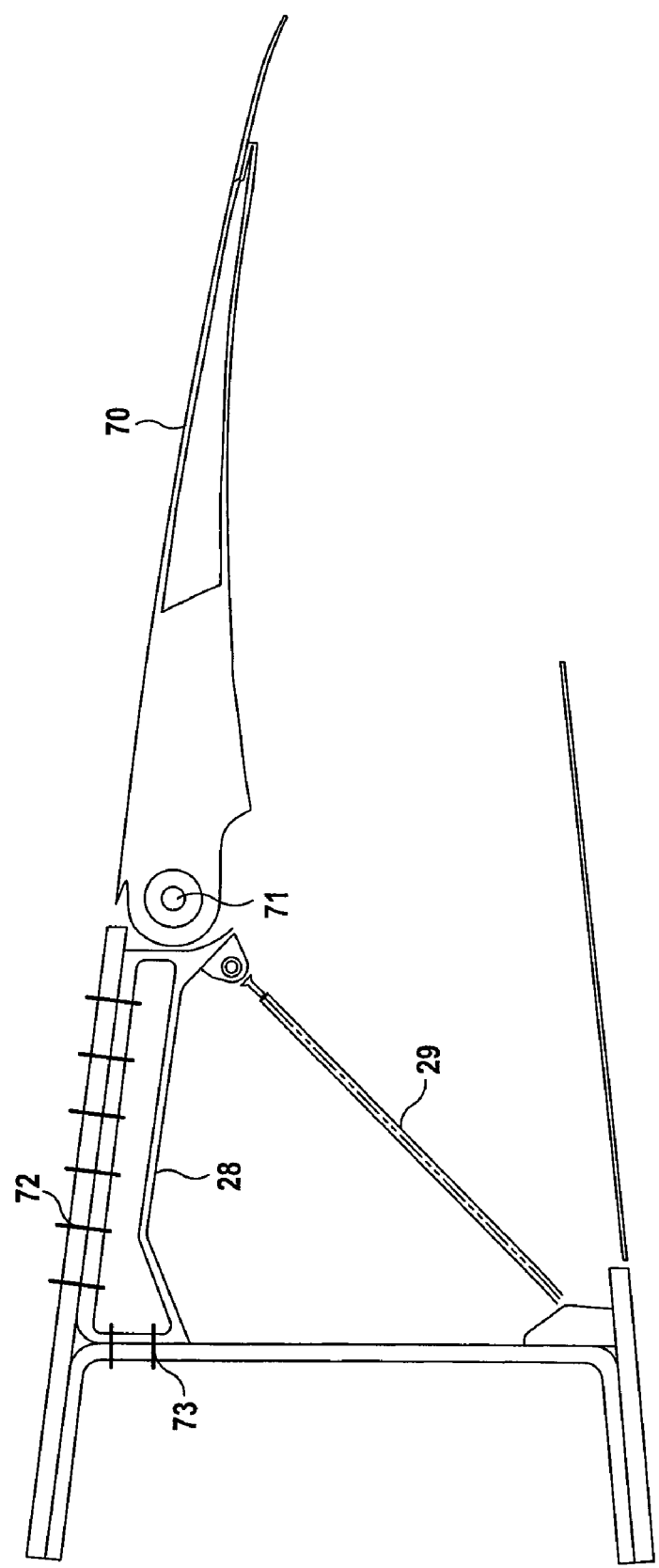
FIG. 7 is a sectional side view showing a spoiler pivotally attached to the trailing edge of an aircraft wing by the hinge rib of FIG. 3.
Figure 8:
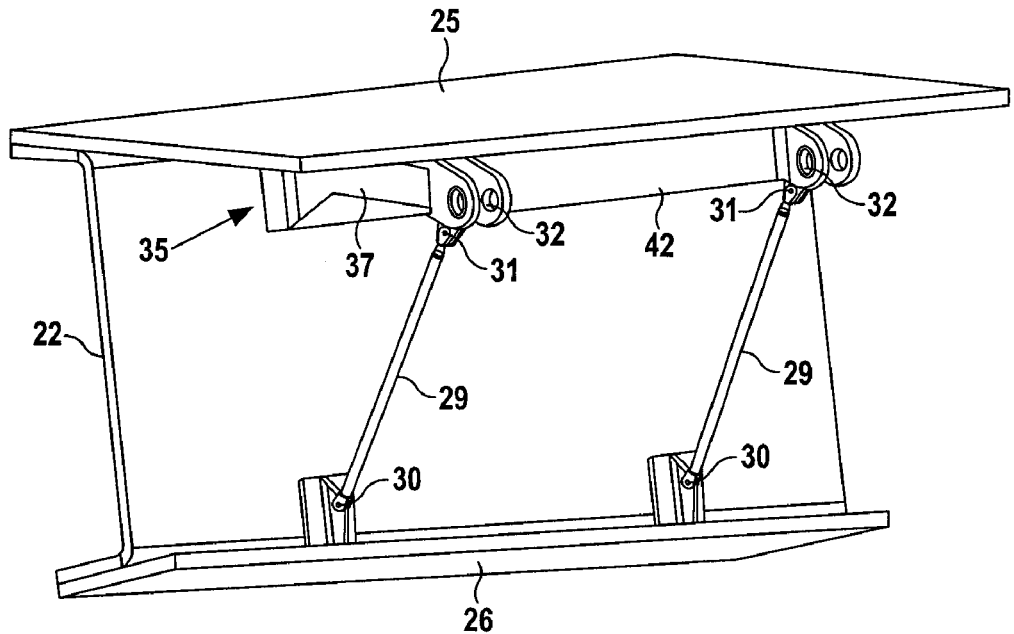
FIGS. 8 and 9 are perspective views of a double hinge rib fitting attached to the trailing edge of an aircraft wing.
Figure 9:
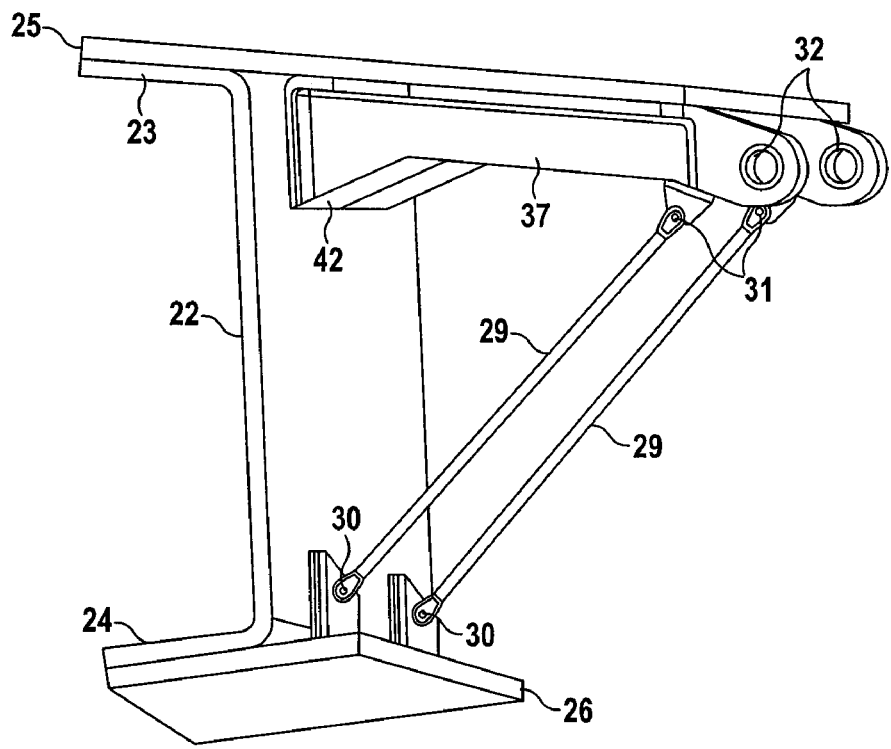
Figure 10:
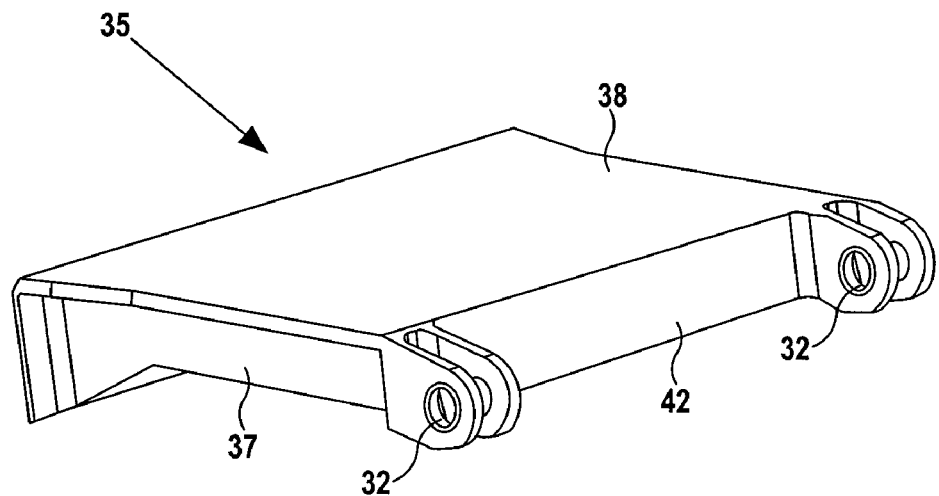
FIG. 10 shows an upper part of the fitting.
Figure 11:
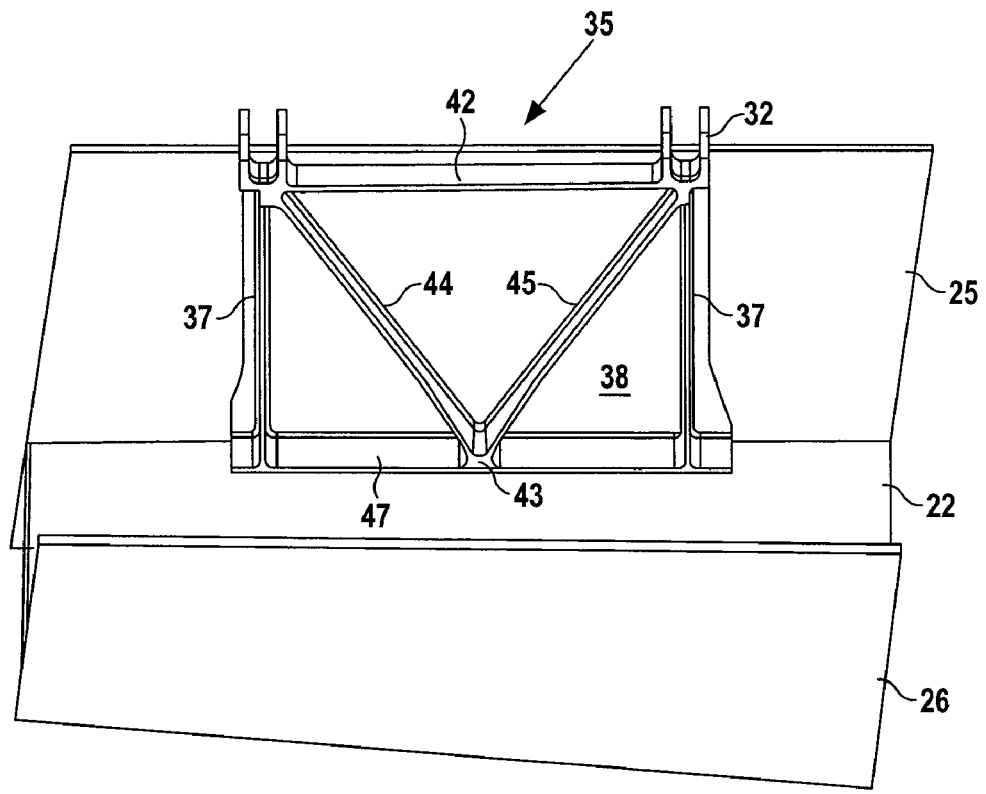
FIG. 11 shows the upper part of the fitting as viewed from below.
Figure 12:
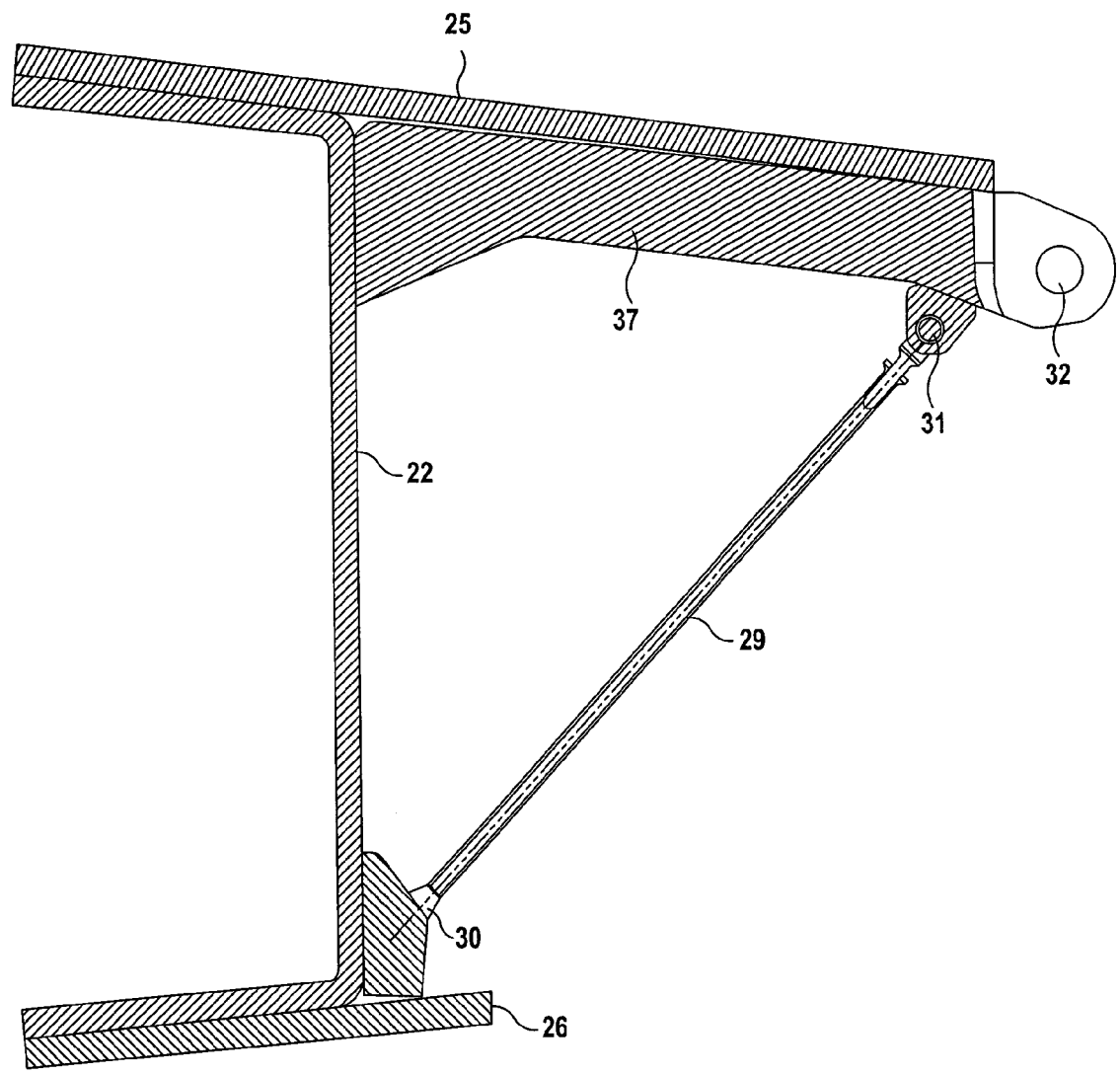
FIG. 12 is a sectional side view of the double hinge rib fitting.

The distal end of the upper hinge rib arm 28 carries a clevis 32 which pivotally mounts the hinge rib assembly 27 to a spoiler 70 as shown in FIG. 7.

Figure 1:
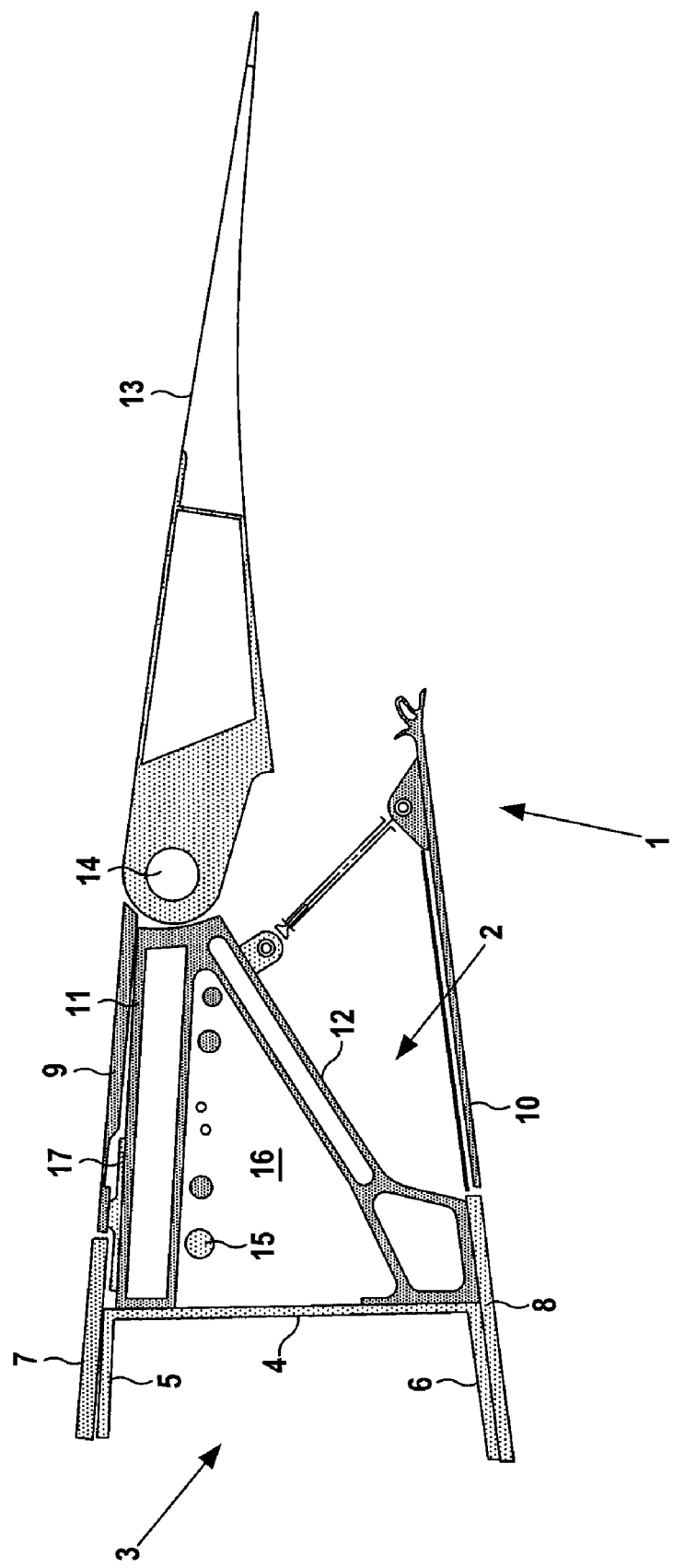
FIG. 1 shows a spoiler pivotally attached to the trailing edge of an aircraft wing with a conventional one part hinge rib.
Figure 2:
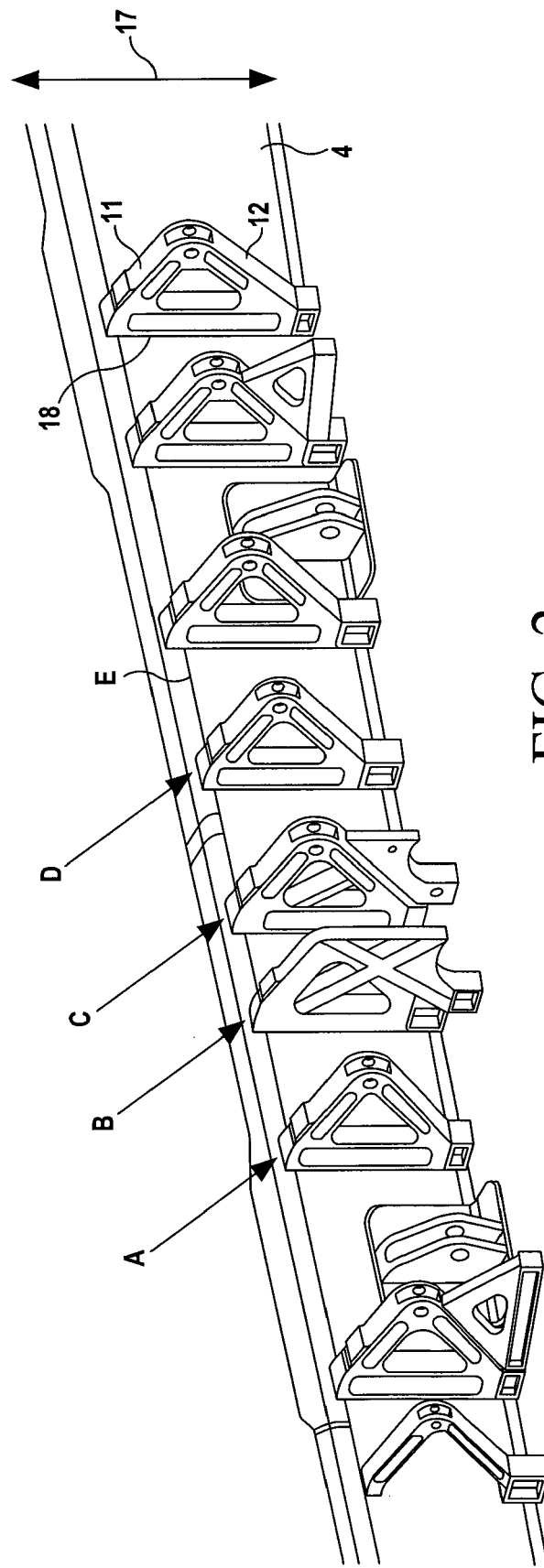
FIG. 2 shows a line of conventional one part hinge ribs attached to a rear spar web.

In comparison with the conventional design shown in FIG. 1, the upper cover 25 is extended to significantly overhang the spar web 22 to its rear, eliminating the requirement for a separate panel such as the panel 9 shown in FIG. 1. This is beneficial as it decreases the complexity and overall part count of the wing.

To reduce the weight of the wing, the overhanging portion of the upper cover 25 may be ramped down in thickness aft of the rear spar web 22 (as described below with reference to FIG. 19). However, even with such ramps the weight of the overhanging portion of the cover 25 typically remains greater than that of the panel 9 used in the design of FIG. 1. To take advantage of the strength of the upper cover overhang, the hinge rib assembly 27 is designed to channel more load into the upper cover 25 than into the rear spar 21. To achieve this, the portion of the upper hinge rib arm 28 in contact with the upper cover 25 has a larger surface area than the portion of the upper hinge rib arm 28 in contact with the rear spar 21. Moreover, to reflect the fact that more load will be channelled through the upper hinge rib arm 28 than through the rod 29, the upper hinge rib arm 28 has a larger minimum cross sectional area than the rod 29.

An advantage of transferring a higher proportion of the load into the cover is that significant weight savings (as well as material cost savings) can be achieved in the design of the hinge rib. This is because the rods 29 are not required to channel as much load. Therefore, they do not have to be as robust and are therefore lighter than the upper hinge rib arms 28. The rods 29 may be a standard part used in other parts of the aircraft which allows further cost savings to be achieved. It may also be possible to reduce the thickness of the overhanging portion of the lower cover 26 as it is no longer required to absorb as much load. This would lead to further weight and material cost savings.

The upper arm 28 reacts lateral, air pressure and interface loads whilst the rod 29 reacts air pressure and interface loads only.

The upper arm 28 may be formed from a metallic material, such as aluminium or an aluminium alloy. Alternatively, the upper arm 28 may be formed from the same composite material as the composite cover 25 and either:

bonded to the upper cover overhang 25a rather than using fasteners;

formed as a separate part as the cover 25a and then co-cured to the cover 25a; or formed integrally with the cover 25a.

Figure 5:
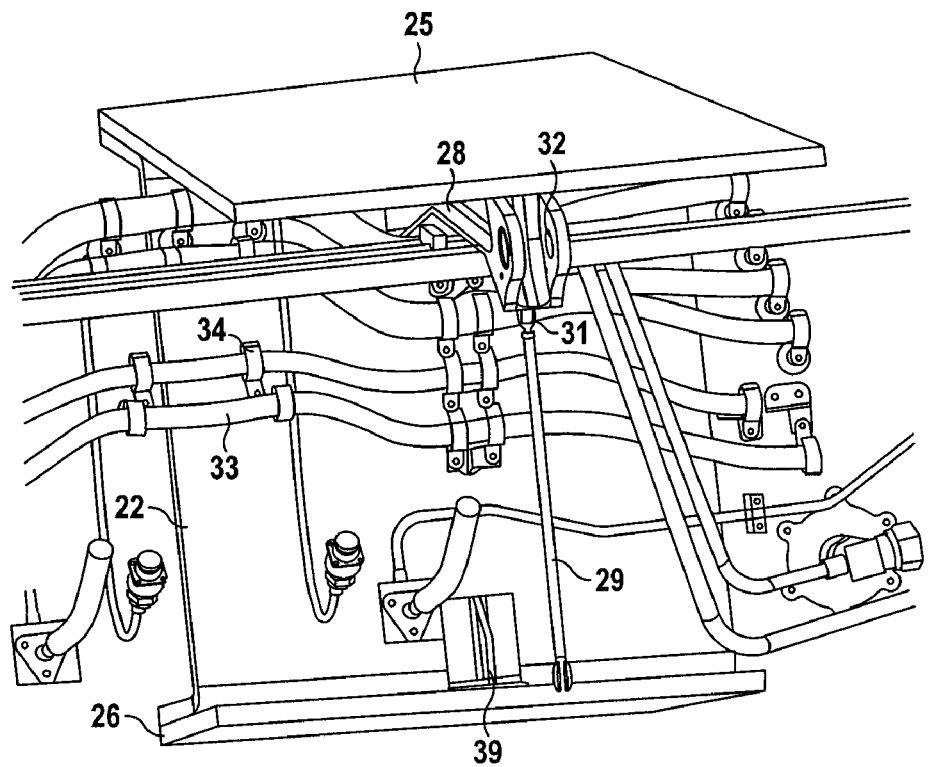
FIG. 5 is a rear view of the hinge rib of FIG. 3 in a partially installed state and also showing systems carried by the rear spar.
Figure 6:
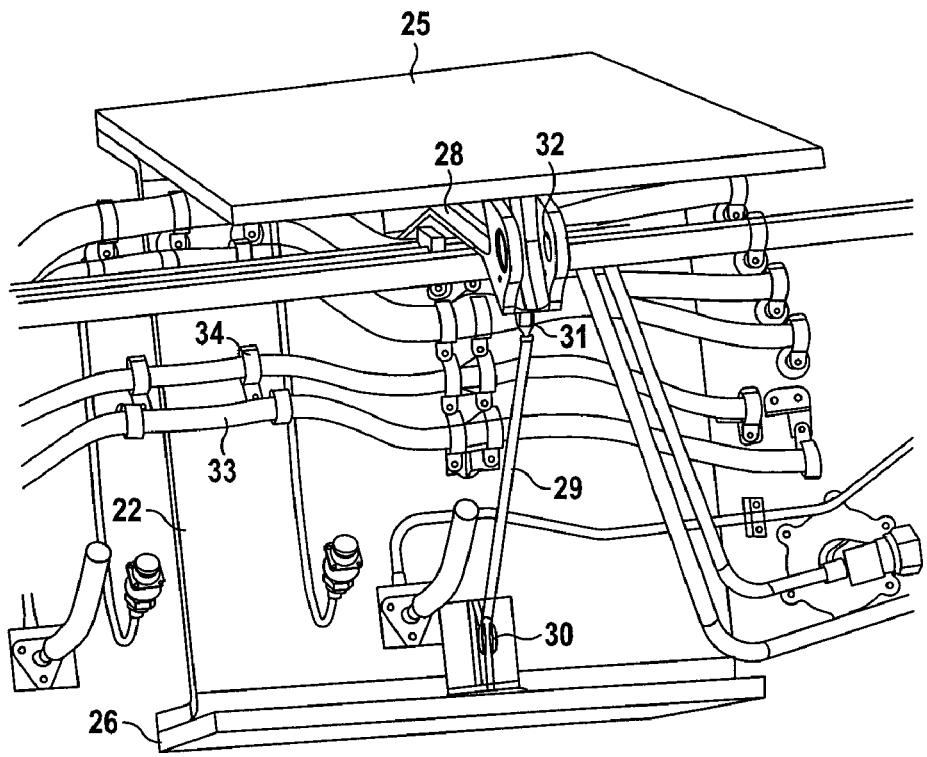
FIG. 6 shows the view of FIG. 5 but with the rod attached to the spar web and lower cover.

A method of installing the hinge rib assembly 27 is illustrated in FIGS. 5 and 6. Electrical cables and hydraulic pipes 33 (collectively referred to below as lines 33) are installed to extend in a span-wise direction along the wing, and fixed to the spar web 22 by clips 34. The upper hinge rib arm 28 is attached to the overhanging portion of the upper cover 25 and to the spar web 22 with fasteners (not shown), either before or after installation of the lines 33. The hinge rib is then assembled by pivotally attaching the rod 29 to the upper hinge rib arm 28 at clevis joint 31 as shown in FIG. 5. Next, the foot of the rod 29 is pivotally attached to the bracket at clevis joint 30 as shown in FIG. 6.

After the hinge rib has been installed as shown in FIG. 6, a spoiler 70 is pivotally mounted to the clevis 32 by a pivot pin 71 as shown in FIG. 7.

To replace or repair one of the lines 33 after the hinge rib assembly 27 has been installed, the rod 29 is disconnected from one or both of the clevis joints 30, 31. The rod 29 is then re-attached when repair/replacement is complete.

Furthermore, damaged hinge ribs can be removed without having to move the damaged hinge rib inboard to a point where the spar is sufficiently deep, as with existing one-part hinge ribs. Instead, the hinge rib assembly 27 can be disassembled in-situ by disconnecting the rod 29 from one or both of the clevis joints 30,31 whilst keeping the upper hinge rib arm 28 attached to the upper cover 25. The upper hinge rib arm 28 and/or rod 29 can then be removed directly aft without being trapped by the closed angle between the upper and lower covers 25, 26.

A first alternative hinge rib design is illustrated in FIGS. 8-12. The hinge rib design is similar to that shown in FIGS. 3-7 and the same reference numerals will be employed for equivalent features. In this case, the hinge rib assembly comprises a fitting 35 shown in detail in FIG. 10 and a pair of rods 29. The fitting 35 comprises a pair of upper arms 37, each upper arm 37 being similar in construction to the upper hinge rib arm 28 in the embodiment of FIGS. 3-7. The arms 37 are formed as a single piece with a web 38 which extends between the arms 37 and is attached to the upper cover 25 by fasteners (not shown). Stiffening flanges 42, 47, 44, 45 extend from the underside of the web 38 as shown most clearly in FIG. 11. The front flange 47 extends span-wise between the feet of the two upper hinge rib arms 37 and is attached to the spar web 22 by fasteners (not shown).

The fitting 35 carries a pair of lugs each of which forms a clevis joint 31 with a respective rod 29, in a similar manner to the embodiment of FIGS. 3-7. Note that these lugs are omitted in FIGS. 10 and 11 for purposes of clarity.

The web 38 and flanges 42, 47, 44, 45 together act as a spacer, maintaining a desired distance between the arms 37 as the fitting is attached. The design of the spacer between the arms 37 is not restricted to the form described here and may take any other suitable form. For example, the flanges 44, 45 may be connected from the midpoint of flange 42 to the feet of respective hinge rib arms 37 or they may be omitted altogether.

The webs 38 and flanges 42, 47, 44, 45 also increase the stiffness of the assembly and assist in absorbing loads from the spoiler.

Figure 13:
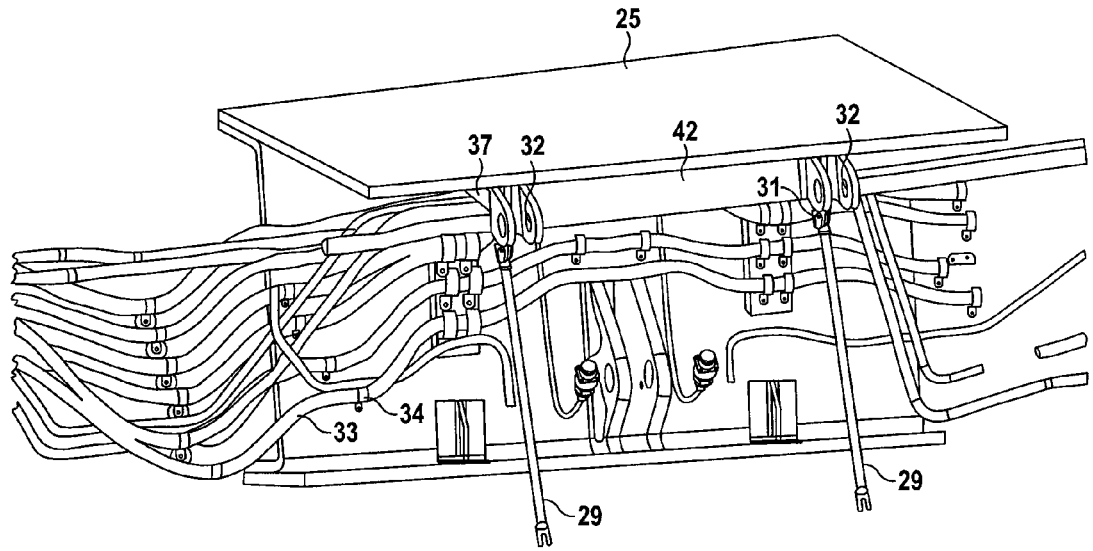
FIG. 13 is a rear view of the double hinge rib fitting of FIG. 8 in a partially installed state and also showing systems carried by the rear spar.
Figure 14:
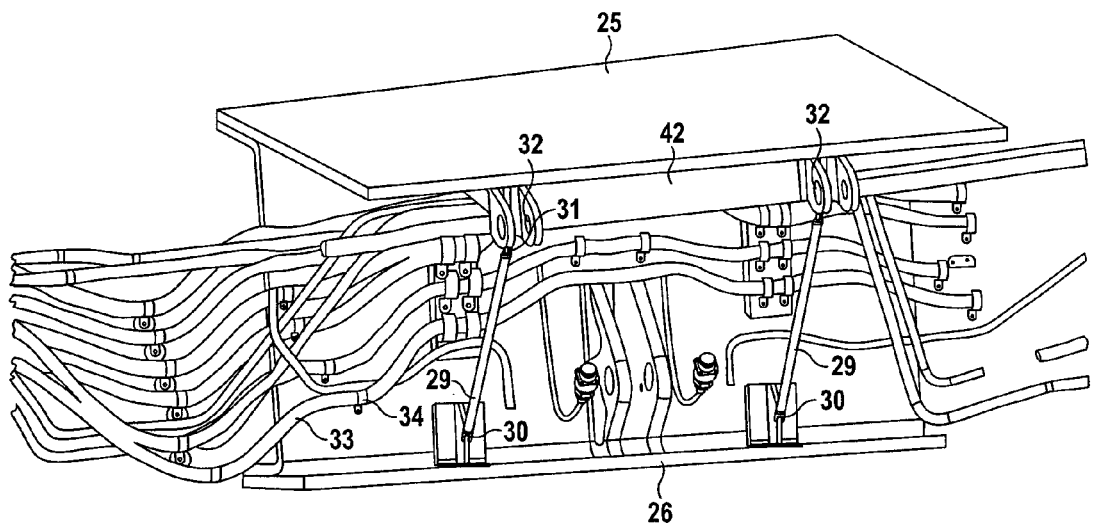
FIG. 14 shows the view of FIG. 13 but with the rods attached to the spar web and lower cover.

A method of installing the hinge rib assembly of FIGS. 8-12 is illustrated in FIGS. 13 and 14. The method is equivalent to the method described with reference to FIGS. 4 and 5. The assembly can be disassembled for repair or maintenance purposes in a similar fashion.

Figure 15:
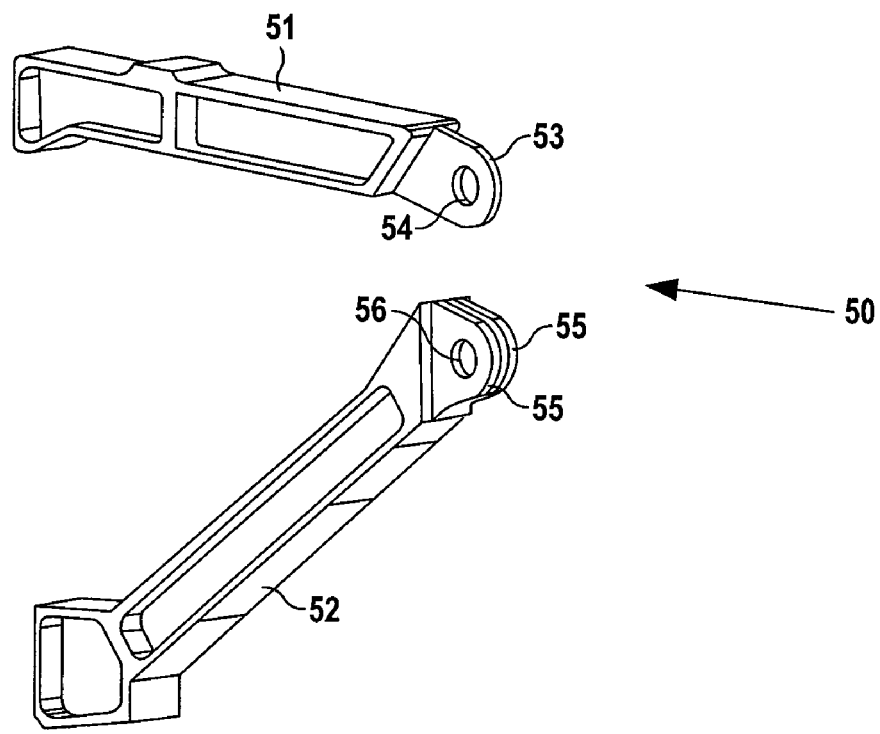
FIG. 15 shows a further two-part hinge rib prior to assembly.
Figure 16:
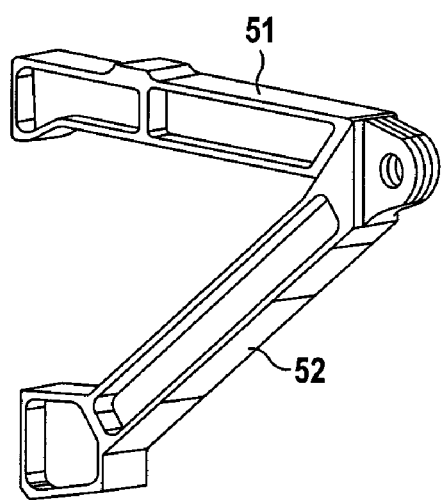
FIG. 16 shows the hinge rib of FIG. 15 in its assembled state.
Figure 17:
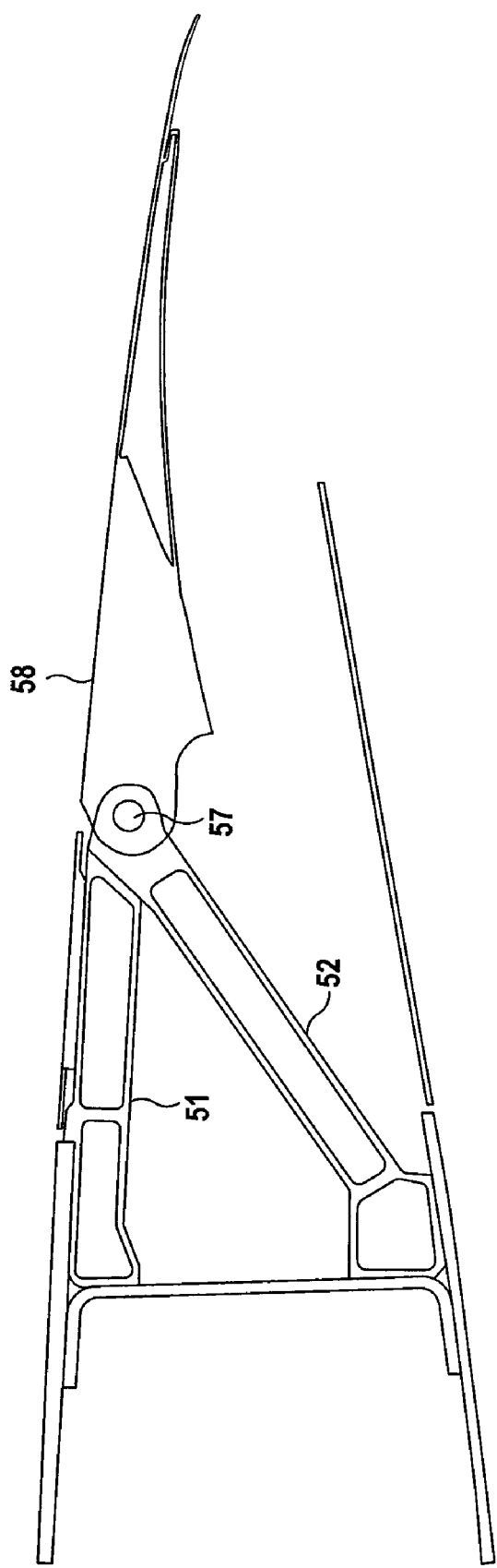
FIG. 17 is a sectional side view showing a spoiler pivotally attached to the trailing edge of an aircraft wing by the hinge rib of FIG. 16.

A second alternative hinge rib assembly 50 is illustrated in FIGS. 15-17. The hinge rib assembly 50 comprises an upper hinge rib arm 51 and a lower hinge rib arm 52. As shown in FIG. 15, the upper hinge rib arm 51 has a lug 53 on its distal end with a hole 54. The distal end of the lower hinge rib arm 52 carries a pair of lugs 55 each with a hole 56. As shown in FIG. 16, the hinge rib is assembled by fitting the lug 53 between the pair of lugs 55 with the holes 54,56 aligned. As shown in FIG. 17, the holes 54, 56 receive a pin 57 which pivotally attaches the hinge rib assembly 50 to a clevis on a spoiler 58.

In an alternative embodiment (not shown) the clevis may be on the hinge-rib side instead of on the spoiler side. In this case one arm of the clevis is formed by a lug on a distal end of the hinge rib arm 51, and the other arm of the clevis is formed by a lug on a distal end of the hinge rib arm 52.

In a further alternative, one of the lugs 55 on the lower hinge rib arm 52 may be omitted so that the arms 51, 52 are connected together by a halving (or lap) joint.

Similarly, instead of being pivotally connected to the spoiler 58 by a clevis joint, the connection between the hinge rib and the spoiler may be made by a rotating halving (or lap) joint.

In contrast with the hinge rib assemblies shown in FIGS. 3 to 14, the two hinge rib arms 51,52 are connected together rigidly.

As shown in FIG. 17, the upper hinge rib arm 51 is connected to the overhanging portion of an upper cover, to a spar web and to an upper panel. The lower hinge rib arm 52 is connected to the overhanging portion of a lower cover and to the spar web. The two arms 51, 52 are designed with very similar minimum cross sectional areas. This enables a similar load to be reacted by each arm 51, 52.

The fact that the hinge rib assembly 50 is formed in two parts provides a number of benefits over the existing one-part hinge rib design shown in FIG. 1. Firstly, the amount of wasted material involved in manufacturing the hinge rib may be greatly reduced as the two arms 51, 52 no longer have to be manufactured simultaneously from the same billet of material. Secondly, each arm 51, 52 can be manufactured so that the grain direction of the aluminium runs along the length of the arm, optimising the strength of the material. Thirdly, in common with the hinge rib assemblies described above with reference to FIGS. 3-14, flexible lines can be installed and/or removed without having to thread them through the hinge rib. Fourthly, in common with the hinge rib assemblies described above with reference to FIGS. 3-14, the hinge rib assembly 50 may be assembled and/or disassembled without being constrained by the closed angle formed by the upper and lower covers 25, 26.

The aluminium alloy billet from which the arms 51, 52 are machined has a single longitudinal grain direction. Typically the billet is manufactured by roll-forming and the grain direction is aligned with the rolling direction. Traditional "A-frames" typically comprise two integrally formed arms, which lie at angles of 450 to each other. As the two arms in a traditional A-frame are formed at the same time from the same billet of material, only one arm can take full advantage of the grain flow. However, here, as the arms 51, 52 are formed separately, each arm can be manufactured separately in line with the longitudinal grain flow of the (perhaps separate) billet. This is illustrated in FIG. 18, wherein the arrows indicate the direction of the longitudinal grain flow. Thus, both arms can take full advantage of the strength of the material. Moreover, the utilisation of material from a single billet is improved as more single arms than "A-frames" can be nested into a single billet.

FIG. 19 shows the upper hinge rib arm 28 of the hinge rib 27 installed in an alternative wing with a ramped composite upper cover 25*a*. A variety of types of composite material may be used, but most typically the cover 25*a* is formed from a laminar composite material, each ply comprising a set of unidirectional carbon fibres impregnated with an epoxy resin matrix. Note that the lug for pivotally attaching the rod 29 to the arm 28 is hidden in FIG. 19, and the rod 29 is omitted for purposes of clarity.

The overhanging portion of the upper cover 25*a* includes ramps 60 along which the cover thickness reduces in a rearward chord-wise direction away from the spar web 22, and a pair of ramps 61 where the cover changes in thickness in a span-wise direction parallel with the rear spar. The ramps 60,61 are each formed by a series of terminating plies of the laminar composite.

The hinge rib arm 28 is attached to the relatively thick ridge in the cover 25*a* between the ramps 61. The cover 25*a* has substantially constant thickness along this ridge, and in the areas 62 between adjacent hinge ribs.

The arrangement of FIG. 19 optimises the structural integrity of the upper cover 25*a* where it is required to channel significant loads and reduces the weight of the cover 25*a* between the rib arms 28 where the extra strength is not required.

Although the hinge ribs described above are all used to attach a spoiler to the trailing edge of a wing, the invention is equally applicable to other control surfaces such as ailerons, elevators, rudder or spoilers. By way of example, FIG. 20 shows a two-part hinge rib assembly 80 (similar in construction to the assembly 27 shown in FIGS. 3-7) pivotally mounting an aileron 81 to the trailing edge of a wing.

Although the invention has been described above with reference to one or more preferred embodiments, it will be appreciated that various changes or modifications may be made without departing from the scope of the invention as defined in the appended claims.

The invention claimed is:

1. A method of installing an aerodynamic control element on an aircraft structure, the aircraft structure comprising a rear spar, an upper cover which is attached to the rear spar and overhangs to its rear, and a lower cover which is attached to the rear spar and overhangs to its rear, the method comprising in any order:
   a. fastening a first hinge rib arm directly to a first one of the covers;
   b. assembling a hinge rib by connecting the first hinge rib arm to a second hinge rib arm;
   c. fastening the second hinge rib arm directly to a second one of the covers; and
   d. pivotally mounting the aerodynamic control element to the hinge rib.

2. The method of claim 1 further comprising:
   e. before assembling a hinge rib by connecting the first hinge rib arm to a second hinge rib arm or fastening the second hinge rib arm to a second one of the covers, installing one or more elongate lines which extend in a span-wise direction along the aircraft structure.

3. The method of claim 1, further comprising: fastening a first hinge rib arm to a first one of the covers or fastening the second hinge rib arm to a second one of the covers before assembling a hinge rib by connecting the first hinge rib arm to a second hinge rib arm.

4. An aircraft structure comprising;
   a rear spar,
   an upper cover which is attached to the rear spar and overhangs to its rear;
   a lower cover which is attached to the rear spar and overhangs to its rear,
   a hinge rib assembly comprising:
   a first hinge rib arm fastened directly to a first one of the covers; and
   a second hinge rib arm connected to the first hinge rib arm and fastened directly to a second one of the covers; and
   an aerodynamic control element pivotally mounted to the hinge rib assembly;
   wherein the first and second hinge rib arms are separate parts.

5. The structure of claim 4 wherein the first hinge rib arm is pivotally connected to the second hinge rib arm.

6. The structure of claim 5 wherein the second hinge rib arm is pivotally connected to the second one of the covers.

7. The structure of claim 4 wherein the first hinge rib arm has a greater maximum cross-sectional area than the second hinge rib arm.

8. The structure of claim 4 wherein the first and second hinge rib arms are also each attached to the rear spar.

9. The structure of claim 4 wherein the upper and lower covers converge towards each other aft of the rear spar.

10. The structure of claim 4 further comprising one or more elongate lines passing through a space between the hinge rib arms in a span-wise direction.

11. The structure of claim 4 wherein one of the covers comprises one or more ramps along which the thickness of the cover decreases.

12. A method of disassembling the structure of claim 4, the method comprising disconnecting the second hinge rib arm from the first hinge rib arm or from the second one of the covers whilst keeping the first hinge rib arm attached to the first one of the covers.

13. The method of claim 12 further comprising: detaching the first or second hinge rib arm from the respective cover thereof after the second hinge rib arm has been disconnected.

14. The method of claim 12 further comprising removing or repairing an elongate line passing through a space between the hinge rib arms in a span-wise direction.

* * * * *